Jan. 1, 1952  T. E. DUFFEY  2,580,414

CAPSULE

Filed March 1, 1948

Inventor

*Thomas Edward Duffey*

By
*Bailey, Stephens, & Huettig*
Attorneys

Patented Jan. 1, 1952

2,580,414

UNITED STATES PATENT OFFICE 2,580,414

CAPSULE

Thomas Edward Duffey, West Palm Beach, Fla.

Application March 1, 1948, Serial No. 12,450

11 Claims. (Cl. 206—84)

The present invention relates to capsules which are constructed so as to facilitate the discharge of their contents when they are placed in the medium in which they are to be used. More particularly, the present invention relates to capsules which are soluble or soften when in contact with an aqueous medium, which capsules are provided with means exerting a bursting action upon the capsule when softened in such medium to accelerate the dissemination of the contents of the capsules.

Capsules of many forms have been previously used to hold liquids or solids, which capsules are of such composition that the contents are released when such capsules are placed in the medium of intended use. For example, many hard and soft gelatine capsules have been provided for medicaments, which capsules when ingested will disintegrate sufficiently to release the medicament. In some instances, it has been found, however, that the disintegration of the capsules does not proceed rapidly enough to prevent expulsion of the capsule before its contents have been released as, for example, is sometimes the case when worming capsules are administered to a dog and the dog regurgitates the capsules before they have had the opportunity to disintegrate. If the gelatine or other material of the capsule is rendered more soluble, difficulties are encountered in the keeping qualities of the capsules as moisture from the atmosphere has too great a disintegrating effect. Also, in some instances, it may be desired to provide a capsule which will release its contents when placed in a cool medium which normally would only tend to soften the capsule and not cause sufficient solution to effect discharge of the contents. This is notably true in the case of capsules made of gelatine which, while they will dissolve relatively rapidly in a warm aqueous medium, will only soften and swell in a cool aqueous medium and only discharge their contents after a considerable period of time or not at all.

It is an object of my invention to provide a novel construction for capsules which will facilitate the release of the material contained therein when such capsule is placed in the environment where the contents of the capsule are to be disseminated.

It is a further object of the invention to provide a relatively cheap construction of capsules adapted to mass production which will render it possible to use capsules to disseminate their contents rapidly in locations where previously known capsules only disseminated their contents slowly or not at all.

It is still another object of the invention to provide a capsule containing a pesticide which will automatically disseminate such pesticide when it is placed in a medium which will at least soften such capsule.

It is a special object of the invention to provide a novel capsule containing a pesticide which will rapidly release such pesticide when it is placed in water or moist situations.

It has been found that the ordinary capsules which are made of hard or soft gelatine are not entirely satisfactory under certain conditions, as they will not discharge their contents with sufficient rapidity when they are placed in the medium in which their contents are to be disseminated. In accordance with the invention, it has been possible to overcome these difficulties by a novel construction of the capsules. The capsules, in accordance with the invention, are provided with special means which will effect rupturing of the capsules when such capsules become soft when they are placed in the medium in which they are to release their contents.

The means employed to effect the rupturing of the capsule may be means which exert pressure on either an exterior or interior wall of the capsule, but in the preferred embodiment of the invention, a sealed capsule which will soften in the medium in which it is intended to be used is provided with means exerting a constricting action thereon. Consequently, when the capsules soften in the medium in which they are used, the constricting means not only causes a rupturing of the capsule, but also effects a discharge of the contents by the constricting action. The most effective means for exerting such a constricting action is a constricting band such as, for example, an annular elastic band or a spring which is stretched over the capsule. The stretched elastic band or spring could also, of course, be incorporated directly in the walls of the container, but such equivalent construction would only tend to add to the cost of production. It would also be possible to insert a compressed spring within the capsule which would rupture such capsule when it softens, but this embodiment of the invention is less preferred as it would only effect rupturing the capsule without exerting a squeezing effect thereon to discharge the contents.

If desired, the capsule, in accordance with the invention, may be produced of gelatine or other material which is inert with respect to the contents, but is capable of softening in the presence of moisture in the location in which it is to be used, so that the capsule could be used in moist locations rather than actually in contact with water in liquid form. In such instance, of course, it would be necessary to protect such capsules from the atmosphere until shortly before use.

The objects and advantages of this invention will be apparent from the following description which, considered in connection with the drawings, sets forth preferred embodiments of my invention.

Referring to the drawings.

Figure 1:
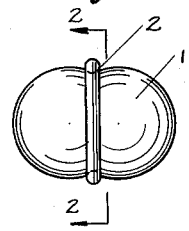
Fig. 1 shows a plan view of one embodiment of a capsule in accordance with the invention.
Figure 2:
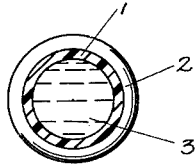
Fig. 2 is a cross-section of the embodiment of the invention shown in Fig. 1 along line 2—2.

Figures 1 and 2 show the preferred embodiment of the invention. The soft gelatine capsule 1 contains a pesticide 3 such as, for example, a 25% solution of dichloro diphenyl trichloroethane (DDT) in xylene and a surface active agent. A rubber band 2, which in unstretched condition is preferably about ⅓ the size of the capsule, encircles the capsule. Other constricting means obviously could be employed in place of the rubber band. This capsule is admirably suited in mosquito control, as such capsules need only be thrown into the pools of water where mosquito larvae are likely to be present, obviating the necessity of cumbersome and expensive spray equipment. A capsule containing about 5 cc. of the above solution is capable of killing the mosquito larvae present in a pool of water having a surface area of about 25 ft. by 25 ft. In pools of water in which the temperature is below 80° F. a gelatine capsule not provided with a bursting means in accordance with the invention is most unsatisfactory, as it will usually only swell in the water and not release the pesticide for a considerable period of time, rendering the mosquito control rather uncertain. The capsule provided with the constricting means in accordance with the invention, on the other hand, will release the pesticide even in a cold water pool in a very short time providing for certain mosquito control.

The embodiment of the invention shown in Figs. 1 and 2 would be equally well suited as a worming capsule containing, for example, tetrachloroethylene, the constricting element 2 insuring rapid release of the tetrachloroethylene before possible expulsion after administration because the constricting means will burst the capsule when it softens, and furthermore, squeeze out the worming medicine.

Figure 3:
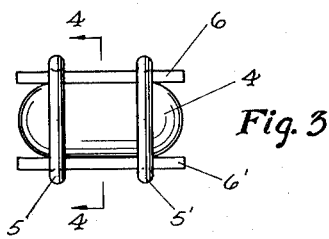
Fig. 3 is a plan view of another embodiment of the invention.
Figure 4:
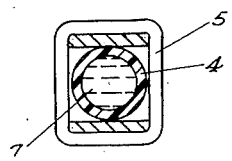
Fig. 4 is a cross-section of the embodiment of the invention shown in Fig. 3 along line 4—4.

Figs. 3 and 4 show an embodiment of the invention in which a water softenable capsule 4 containing pesticide 7 is provided with splints 6 and 6', which are urged together by prestretched rubber bands 5 and 5'. The action of this embodiment of the invention is somewhat similar to that disclosed in Figs. 1 and 2, but the splints 6 and 6' assist in expelling the pesticide 7 after the capsule softens and is burst by the constricting action of rubber bands 5 and 5'.

Figure 5:
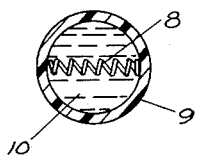
Fig. 5 is a cross-sectional view of a further embodiment of the invention.

Fig. 5 shows still another modification of the invention in which the rupturing element, a compressed spring 8, is provided within the capsule 9, which is made of a material capable of softening when placed in the location of intended use. In this embodiment the spring will punch through the capsule when it softens and release the pesticide 10.

Figure 6:
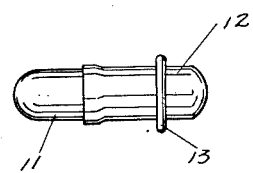
Fig. 6 is a plan view of another embodiment of the invention.

Fig. 6 shows still another embodiment of the invention in which the capsule is composed of an insoluble or non-softenable section 11 and a softenable section 12, and a constricting band 13 around the softenable section 12. This modification of the invention is especially suitable in the case where the pesticide enclosed therein is lighter than the medium in which it is to be released. In such case, the insoluble portion of the capsule may be made of a material sufficiently heavy with reference to the softenable section so that the capsule will assume a position in the medium in which it is used with the softenable portion directed upwardly so that when the softenable portion is ruptured, there is little danger of entrapment of the pesticide.

While the invention has been described with special reference to gelatine capsules, it is obvious that other materials may be used for such capsules without departing from the invention, as long as such materials will soften or dissolve in the medium in which the contents of the capsules are to be disseminated and are substantially inert with respect to such contents.

I claim:

1. An article of manufacture comprising in combination with a sealed soft gelatine capsule containing a material to be disseminated in an aqueous medium, said soft gelatine being capable of further softening in the aqueous medium, inanimate mechanical pressure exerting means carried by and directly contacting said capsule and exerting pressure upon at least one wall of the capsule, which pressure is sufficient that it automatically causes rupture of the capsule when it softens in the aqueous medium in which the contents of the capsule are to be disseminated.

2. A capsule containing a material to be disseminated, comprising a sealed capsule composed of a material which will at least soften in the medium in which the contents of the capsule are to be disseminated and a stretched rubber band surrounding said capsule and exerting an inwardly directed pressure against said capsule.

3. A capsule containing a material to be disseminated, comprising a sealed gelatine capsule which will at least soften in an aqueous medium and a stretched rubber band surrounding said capsule and exerting an inwardly directed pressure against said capsule.

4. A pesticide package from which the pesticide is adapted to be disseminated in a certain medium comprising a sealed capsule composed of a material which will at least soften in the medium in which the pesticide is to be disseminated, a fluid pesticide within said capsule, and constricting means surrounding the capsule exerting an inwardly directed pressure against said capsule, which pressure will automatically rupture the capsule when it softens in the medium in which the pesticide is to be disseminated.

5. A pesticide package from which the pesticide is adapted to be disseminated in an aqueous medium comprising a sealed capsule composed of a material which will at least soften in such aqueous medium, a fluid pesticide within said capsule, and constricting means surrounding the capsule exerting an inwardly directed pressure against said capsule, which pressure will automatically rupture the capsule when it softens in the aqueous medium in which the pesticide is to be disseminated.

6. A packaged insecticide, comprising a sealed soft gelatine capsule, said soft gelatine being capable of further softening in an aqueous medium, a pesticide solution within said capsule, and a stretched rubber band surrounding said capsule and exerting an inwardly directed pressure against such capsule sufficient to rupture said capsule automatically when it softens in an aqueous medium.

7. An article of manufacture comprising in combination with a sealed capsule containing a material to be disseminated in a predetermined medium, at least a portion of said capsule being composed of a material which will at least soften in said medium, inanimate mechanical pressure exerting means carried by and directly contacting said capsule and exerting pressure upon at least one wall of the portion of said capsule composed of the material which will soften in said medium, which pressure is sufficient to rupture said portion automatically when it softens in said medium.

8. An article of manufacture comprising in combination with a sealed capsule containing a material to be disseminated in an aqueous medium, at least a portion of said capsule being composed of a material which will at least soften in such aqueous medium, inanimate mechanical pressure exerting means carried by and directly contacting said capsule and exerting pressure upon at least one wall of the portion of the capsule composed of the material which will at least soften in said aqueous medium, which pressure is sufficient to rupture said portion automatically when it softens in said aqueous medium.

9. An article of manufacture comprising in combination with a sealed capsule containing a material to be disseminated in an aqueous medium, at least a portion of said capsule being composed of a gelatin which will at least soften in such aqueous medium, inanimate mechanical pressure exerting means carried by and directly contacting said capsule and exerting pressure upon at least one wall of the portion of the capsule composed of said gelatin which will at least soften in said aqueous medium, which pressure is sufficient to rupture said portion automatically when it softens in said aqueous medium.

10. In combination with a sealed capsule containing a material to be disseminated in a predetermined medium at least a portion of said capsule being composed of a material which will at least soften in said medium, constricting means surrounding said capsule and exerting an inwardly directed pressure upon at least said portion of the capsule which is composed of said material which will soften in such medium, the pressure exerted by said constricting means being sufficient automatically to cause rupture of said portion when it softens in said medium.

11. In combination with a sealed capsule containing a material to be disseminated in a predetermined medium at least a portion of said capsule being composed of a material which will at least soften in said medium, a stretched rubber band surrounding said capsule and exerting an inwardly directed pressure upon at least said portion of the capsule which is composed of said material which will soften in such medium, the pressure exerted by said stretched rubber band being sufficient automatically to cause rupture of said portion when it softens in said medium.

THOMAS EDWARD DUFFEY.

REFERENCES CITED

The following references are of record in the file of this patent:

UNITED STATES PATENTS

| Number | Name | Date |
|---|---|---|
| 1,607,626 | Hopkinson | Nov. 23, 1926 |
| 1,978,217 | Muckerjee | Oct. 23, 1934 |
| 2,089,728 | Brogden | Aug. 10, 1937 |
| 2,397,051 | Scherer | Mar. 19, 1946 |